United States Patent
Huang et al.

(10) Patent No.: US 11,875,239 B2
(45) Date of Patent: *Jan. 16, 2024

(54) MANAGING MISSING VALUES IN DATASETS FOR MACHINE LEARNING MODELS

(71) Applicant: FAIR ISAAC CORPORATION, Roseville, MN (US)

(72) Inventors: Chong Huang, San Jose, CA (US); Arash Nourian, Alamo, CA (US); Feier Lian, San Jose, CA (US); Longfei Fan, Los Altos, CA (US); Kevin Griest, Sausalito, CA (US); Jari Koister, Menlo Park, CA (US); Andrew Flint, El Cerrito, CA (US)

(73) Assignee: FAIR ISAAC CORPORATION, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,328

(22) Filed: Jan. 30, 2023

(65) Prior Publication Data
US 2023/0177397 A1    Jun. 8, 2023

Related U.S. Application Data

(63) Continuation of application No. 16/786,293, filed on Feb. 10, 2020, now Pat. No. 11,568,187.
(Continued)

(51) Int. Cl.
*G06N 20/00*     (2019.01)
*G06F 17/18*     (2006.01)
(Continued)

(52) U.S. Cl.
CPC ............ *G06N 20/00* (2019.01); *G06F 17/18* (2013.01); *G06F 18/10* (2023.01); *G06F 18/217* (2023.01); *G06F 18/251* (2023.01); *G06V 10/70* (2022.01)

(58) Field of Classification Search
CPC .. G06K 9/6298; G06K 9/6262; G06K 9/6289; G06K 9/6256; G06K 9/6267; G06F 17/18; G06N 20/00; G06N 3/0454
See application file for complete search history.

(56) References Cited

U.S. PATENT DOCUMENTS 10,510,022 B1  12/2019  Tharrington, Jr. et al.
10,650,667 B1   5/2020  Afghah et al.
(Continued)

FOREIGN PATENT DOCUMENTS

JP    2019537125 A    12/2019

OTHER PUBLICATIONS

Badr, Will. (2019). "6 Different Ways to Compensate for Missing Values in a Dataset (Data Imputation with examples)." Towards Data Science. 10 pages.
(Continued)

*Primary Examiner* — Bobbak Safaipour
*Assistant Examiner* — Wassim Mahrouka
(74) *Attorney, Agent, or Firm* — Mintz, Levin, Cohn, Ferris, Glovsky and Popeo, P.C.

(57) ABSTRACT

Computer-implemented machines, systems and methods for managing missing values in a dataset for a machine learning model. The method may comprise importing a dataset with missing values; computing data statistics and identifying the missing values; verifying the missing values; updating the missing values; imputing missing values; encoding reasons for why values are missing; combining imputed missing
(Continued)

values and the encoded reasons; and recommending models and hyperparameters to handle special or missing values.

20 Claims, 11 Drawing Sheets

Related U.S. Application Data

(60) Provisional application No. 62/888,375, filed on Aug. 16, 2019.

(51) Int. Cl.
    *G06V 10/70*     (2022.01)
    *G06F 18/10*     (2023.01)
    *G06F 18/21*     (2023.01)
    *G06F 18/25*     (2023.01)

(56) References Cited

U.S. PATENT DOCUMENTS

| | | |
|---|---|---|
| 10,824,959 B1 | 11/2020 | Chatterjee et al. |
| 2005/0234697 A1 | 10/2005 | Pinto et al. |
| 2011/0173116 A1 | 7/2011 | Yan et al. |
| 2012/0158623 A1 | 6/2012 | Bilenko et al. |
| 2014/0114839 A1 | 4/2014 | Neuweg et al. |
| 2015/0286955 A1 | 10/2015 | Virkar et al. |
| 2018/0032870 A1 | 2/2018 | Liu et al. |
| 2018/0121817 A1 | 5/2018 | Datta et al. |
| 2019/0043070 A1 | 2/2019 | Merrill et al. |
| 2019/0180358 A1 | 6/2019 | Nandan et al. |
| 2019/0215551 A1 | 7/2019 | Modarresi et al. |
| 2019/0325333 A1 | 10/2019 | Chan et al. |
| 2019/0340518 A1 | 11/2019 | Merrill et al. |
| 2019/0378210 A1 | 12/2019 | Merrill et al. |
| 2020/0089650 A1 | 3/2020 | Sharma et al. |
| 2020/0110982 A1 | 4/2020 | Gou et al. |
| 2020/0143005 A1 | 5/2020 | Nair et al. |
| 2020/0250556 A1 | 8/2020 | Nourian et al. |
| 2021/0049503 A1 | 2/2021 | Nourian et al. |
| 2022/0051773 A1 | 2/2022 | Appelbaum et al. |

OTHER PUBLICATIONS

Casalicchio et al., "Visualizing the Feature Importance for Black Box Models" Dec. 28, 2018, arXiv: 1804.06620v3, pp. 1-16. (Year: 2018).
Chen et al., "An Interpretable Model with Globally Consistent Explanations for Credit Risk" Nov. 30, 2018, arXiv: 1811.12615v1, pp. 1-10. (Year: 2018).
Chen et al., "L-Shapley and C-Shapley: Efficient Model Interpretation for Structured Data." Aug. 8, 2018. (Year: 2018). 17 pages.
Friedberg et al., "Local Linear Forests" Jul. 30, 2018, arXiv: 1807.11408v1, pp. 1-25. (Year: 2018).
Hind et al., "TED: Teaching AI to Explain its Decisions" Jan. 27, 2019, pp. 123-129. (Year: 2019).
Honneger, Milo, "Shedding Light on Black Box Algorithms" Aug. 15, 2018, pp. i-83. (Year: 2018).
Lundberg et al., "Consistent Individualized Feature Attribution for Tree Ensembles" Jun. 18, 2018, arXiv: 1802.03888v2, pp. 1-9. (Year: 2018).
Mcgrath et al., "Interpretable Credit Application Predictions with Counterfactual Explanations" Nov. 16, 2018, arXiv: 1811.05245v2 pp. 1-9. (Year: 2018).
Merrill et al., "Systems and Methods for Decomposition of Non-differentiable and Differentiable Models" Jun. 8, 2018, U.S. Appl. No. 62/682,714. 88 pages. (Year: 2018).
Mittelstadt et al., "Explaining Explanations in AI" Jan. 29, 2019, pp. 279-288. (Year: 2019).
Plumb et al., "Model Agnostic Supervised Local Explanations" Jan. 5, 2019, arXiv: 1807.02910v3, pp. 1-10. (Year: 2019).
Rietschel et al., "Feature Selection for Survival Analysis with Competing Risks using Deep Learning." Jan. 16, 2019. (Year: 2019). 10 pages.
Shrikumar et al., "Learning Important Features Through Propagating Activation Differences" Apr. 10, 2017, arXiv: 1704.02685v1. 9 pages. (Year: 2017).
Singh et al., "EXS: Explainable Search Using Local Model Agnostic Interpretability." Sep. 11, 2018. (Year: 2018). 4 pages.
Tan et al., "Learning Global Additive Explanations for Neural Nets using Model Distillation" Dec. 3, 2018, arXiv: 1801.08640v2, pp. 1-13. (Year: 2018).
Tharrington, Jr. et al., "Efficient and Accurate Estimation of Shapley Additive Explanation Values." Dec. 3, 2018, U.S. Appl. No. 62/774,592. (Year: 2018). 82 pages.
Van Der Zon et al., "ICIE 1.0: A Novel Tool for Interactive Contextual Interaction Explanations." Jan. 1, 2019. (Year: 2019). 28 pages.
Wang, Shaoqian et al. (2019). "Missing Data Imputation for Machine Learning.". In: Li, B., Yang, M., Yuan, H., Yan, Z. (eds) IoT as a Service. IoTaaS 2018. Lecture Notes of the Institute for Computer Sciences, Social Informatics and Telecommunications Engineering, vol. 271. 6 pages. Springer, Cham. https://doi.org/10.1007/978-3-030-14657-3_7.
Yoon et al., "INVASE: Instance-wise Variable Selection Using Neural Networks." Sep. 27, 2018. (Year: 2018). 28 pages.
Zaeri-Amirani et al., "A Feature Selection Method Based on Shapley Value to False Alarm Reduction in ICUs, a Genetic Algorithm Approach." Apr. 26, 2018. (Year: 2018). 6 pages.
Zharov et al., "YASENN: Explaining Neural Networks via Partitioning Activation Sequences." Nov. 7, 2018. (Year: 2018). 9 pages.

FIG. 9

MANAGING MISSING VALUES IN DATASETS FOR MACHINE LEARNING MODELS

CROSS-REFERENCE TO RELATED APPLICATIONS

This application is a continuation application on U.S. patent application Ser. No. 16/786,293 filed on Feb. 10, 2020 and issued as U.S. Pat. No. 11,568,187 on Jan. 31, 2023, which claims priority to and the benefit of the filing date of provisional Application Ser. No. 62/888,375, filed Aug. 16, 2019, the entire contents of which are incorporated by references herein in its entirety.

TECHNICAL FIELD

The disclosed subject matter generally relates to artificial intelligence technology and, more particularly, to technological improvements for managing missing values in machine learning models.

BACKGROUND

Artificial intelligence (AI) refers to introducing human-like logic or intuition in a computing system. AI is commonly used to perform tasks that require intelligence or domain expertise which help solve problems that cannot be defined by a predetermined set of rules or fixed logic. AI systems are thus typically deployed to analyze and classify data and make predictions relying on data and dynamic calculations that are far too voluminous and complex for a human to possibly digest and perform, either mentally or by way of pen and paper or traditional computing machines.

Machine learning (ML) is a subset of AI that utilizes self-learning algorithms to implement intelligent behavior into AI systems and generally refers to the practice of teaching a computing system to learn, including the ability to dynamically adapt and analyze large volumes of data to identify patterns, without requiring explicit detailed programming. Unconventionally, ML models can provide predictive advantages to enhance the functionality of a system or a computing model when complex relationships or constraints are at play.

ML models can provide significant improvements in identifying complex relationships from big datasets compared with traditional models. However, sometimes data points used for training a ML model contain missing values. An expert who is very familiar with the ML model and the data points provided to the ML model may be able to understand or explain why certain values are missing from the training dataset. Regardless, because different values in the data set may be missing for different reasons, it can be very difficult even for a human expert to readily ascertain the true reason why certain values or information are missing.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Computer-implemented machines, systems and methods for managing missing values in a dataset for a machine learning model are provided. To manage the missing values, a dataset with missing values may be imported. Data statistics may be computed and to identify the missing values. In one implementation, the missing values identified based on the data statistics may be verified and the missing values may be accordingly updated. The missing values may be imputed based on the statistical analysis and verification process noted above. In certain aspects, one or more reasons for why certain values are missing may be determined and generated. The imputed missing values and the encoded reasons may be combined and produced as results that are viewable by a human operator, for example, or a machine that can use the result to improve the model with missing input values.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIG. 9 is an illustration of two example approaches for combining the imputed feature values with missing reasons, in accordance with one embodiment.

Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
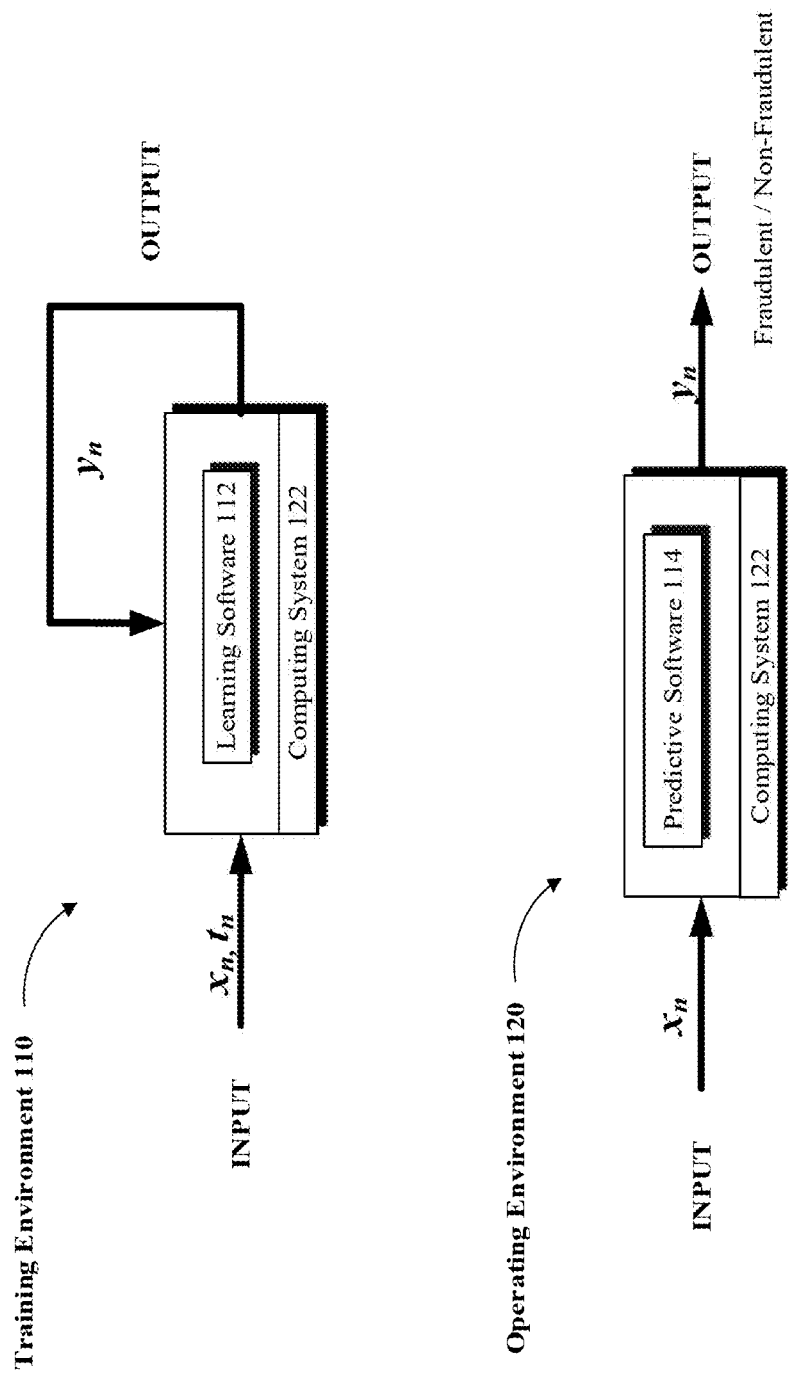
FIG. 1 illustrates example training and operating environments for a ML model, in accordance with one or more embodiments.
Figure 2:
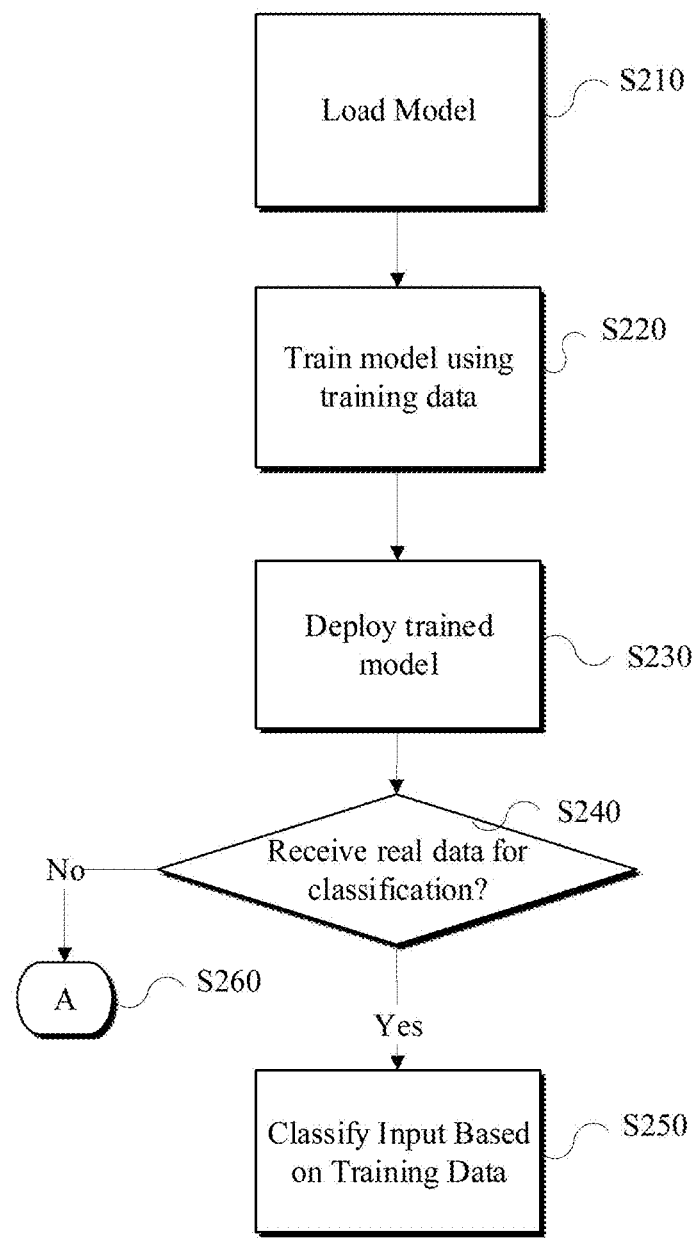
FIG. 2 is an example flow diagram of a method of training and deploying a ML model, in accordance with one or more embodiments.

Referring to FIGS. 1 and 2, example training environment 110 and operating environment 120 for a ML model are illustrated. As shown, a computing system 122 and training data may be used to load a ML model and train the model using training data (S210, S220). The training data may include a dataset having a plurality of values associated with certain data points corresponding to the ML model. In the training phase, learning software 112 may be a machine learning or self-learning software that receives input training data x labeled with a tag t, where the training data is already known as belonging to a certain category.

In accordance with one or more embodiments, learning software 112 may process the training data x associated with certain features without taking the labels t into consideration (i.e., blindly) and may categorize the training data according to an initial set of weights (w) and biases (b). The generated output y may indicate that training data x is classified as belonging to a certain class by learning software 112. In one aspect, the result y may be checked against the associated label (i.e., tag t) to determine how accurately learning software 112 is classifying the training data.

In the initial stages of the learning phase, the categorization may be based on randomly assigned weights and biases, and therefore highly inaccurate. However, learning software 112 may be trained based on certain incentives or disincentives (e.g., a calculated loss function) to adjust the manner in which the provided input is classified. The adjustment may be implemented by way of updating weights and biases over and over again. Through multiple iterations and adjustments, the internal state of learning software 112 may be continually updated to a point where a satisfactory predictive state is reached (i.e., until learning software 112 starts to more accurately classify the training data).

Once the initial training phase is completed, predictive software 114 may be deployed to process real data for classification in operating environment 120, where input data category is unknown (S230, S240). According to past training, software 114 may generate an output y that classifies the input data x as belonging to one or more categories (S250) or otherwise generate a notification or take other appropriate action (S260). In accordance with example embodiments, predictive software 114 may be a trained version of learning software 112 and may be executed over computing system 122 or another suitable computing system or computing infrastructure.

In example embodiments, a ML model may be deployed to analyze data or features associated with an applicant's profile, where the applicant is attempting to apply for obtaining credit or a loan. Based on the analysis of such features, an applicant may be approved or denied credit or may be assigned a certain risk score. It is noteworthy that example implementations and scenarios provided here with reference to financial transactions are for the purpose of illustration and providing an enabling disclosure. These examples should not be construed as limiting the scope of this disclosure to particular scenarios or implementations.

In certain scenarios, managing datasets with missing information may involve deleting data points with missing values. This approach can dramatically reduce the number of useful data samples in the dataset and lead to heavily biased ML models. Instead or in addition to the above approach, depending on implementation, certain ML models may be configured or analyzed using imputation methods that help estimate the missing data from other data points or observations about the ML model or data points.

In accordance with some implementations, values for missing data in a dataset may be imputed based on a mean of values in the same category or features that are not missing. In such implementation, introduction of unexpected biases in the ML model may be monitored to avoid development of models that are unfit for their intended tasks due to unintended introduction of bias into the datasets used to train the ML models. As such, ML imputation methods that preserve the diversity of values in the dataset may be implemented by estimating the value of missing data from observable entries, using one or more approaches that do not treat the missing values in the same manner.

As provided in further detail below, to avoid a routine evaluation of missing data using an imputation technique, additional information such as reasons for the data missing may be determined and reported to a user, in accordance with one or more embodiments. Providing the additional reasons (e.g., in form of reason codes) may help improve support for handling a broad range of datasets with missing values which have different missing reasons.

As an example, when trying to develop a model for loan approval, datasets from banks and credit bureaus may be used. Such datasets may include a lot of missing values due to different reasons. In one instance, a substantive credit history may be missing because the applicant is a new customer or the applicant has closed some or all credit accounts for a long time. The missing value can negatively contribute to the decisions made by the ML model, if not properly accounted for. To improve the ML model's accuracy, the missing values and the corresponding reasons may be considered together (i.e., not in isolation), in accordance with one or more embodiments.

Certain techniques provided herein may be used to help impute missing values in datasets using various informed imputation approaches. The missing value may be managed for numerical and categorical data types and provide for the use of machine learning pipelines on datasets with missing values. Furthermore, a variety of methods are provided that take different reasons or possibilities into account when trying to determine why certain data points are missing. Once the missing values have been managed, the dataset can then be analyzed using standard ML techniques used for complete datasets.

Figure 3:
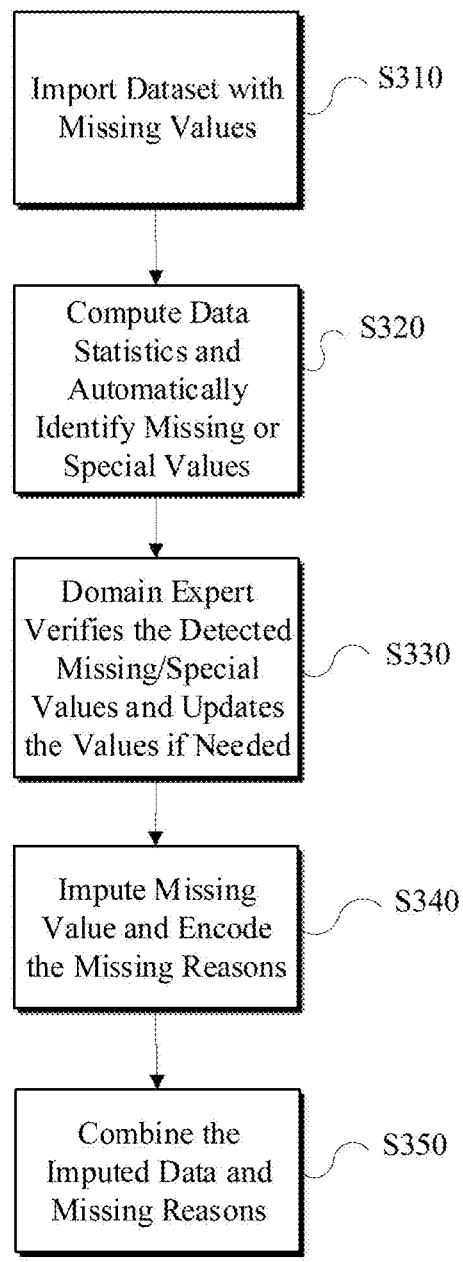
FIG. 3 is an example flow diagram of a method for managing missing data points for a ML model, in accordance with one or more implementations.

Referring to FIG. 3, missing values with different missing reasons for a given dataset for a ML model may be managed as provided below. In one example, a user may import a dataset with missing values (S310). Dataset statistics may be computed and missing or special values may be automatically identified (S320). Missing or special values in the dataset may be verified and updated by a domain expert (S330). Accordingly, special values representing missing values may be imputed based on a user selecting the missing value handling method and any corresponding parameters, and also encoding the missing reasons using user-selected imputation and encoding methods (S340). In one implementation, the imputed data and missing reasons may be combined and reported.

Figure 4:
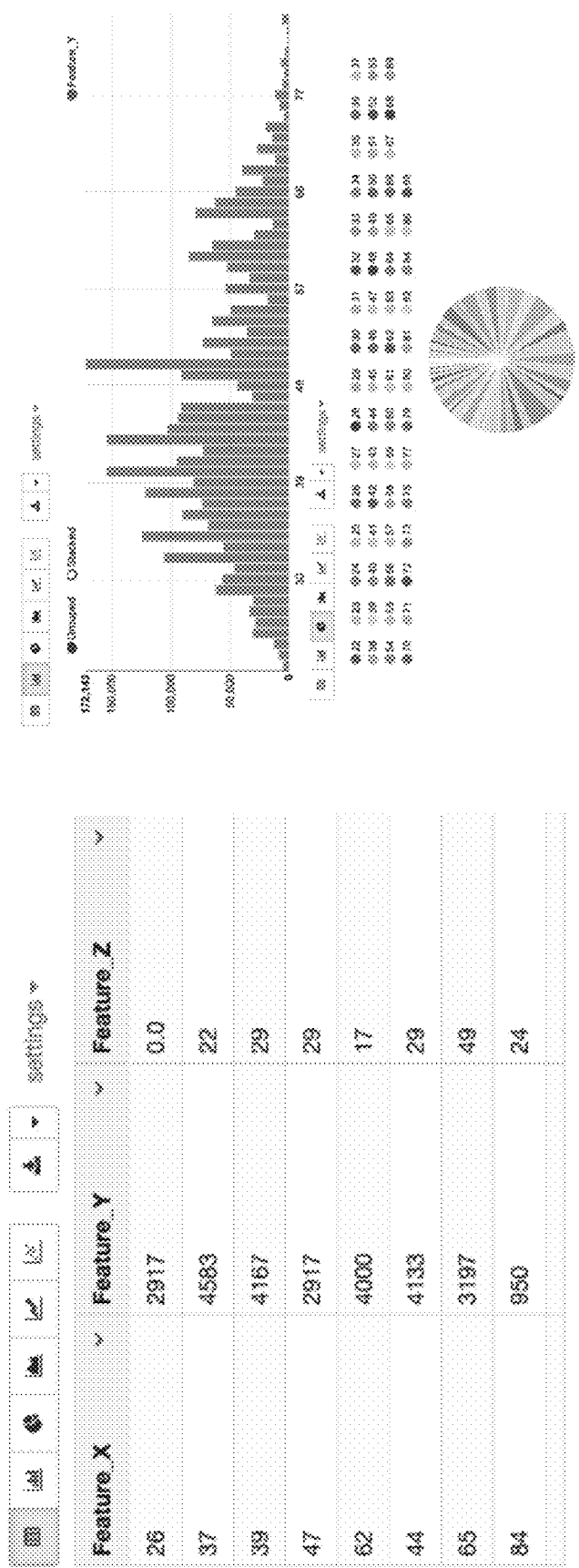
FIG. 4 illustrates an example user interface utilized when importing a dataset for a ML model that helps identify missing values and provides a statistical summary and other relevant information about the dataset, in one embodiment.

Referring to FIG. 4, methods may be implemented to import the dataset with missing values, compute a corresponding statistical summary, and display relevant information about the dataset. In the example of FIG. 4, three features X, Y and Z are presented with the respective values listed for each feature as corresponding to the other features.

Figure 5:
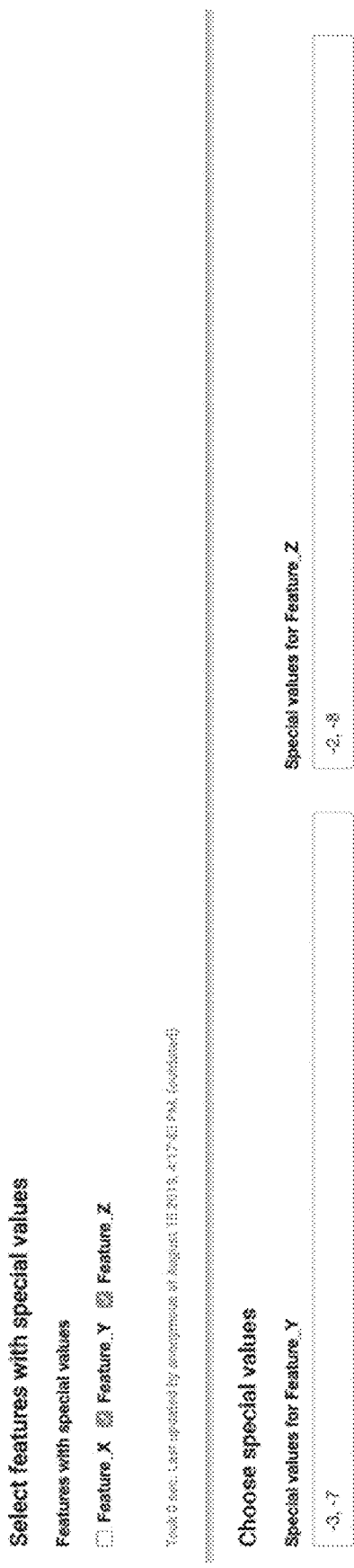
FIG. 5 illustrates an example user interface for automatically pre-identifying a set of features with missing or special values, in example embodiments.
Figure 6:
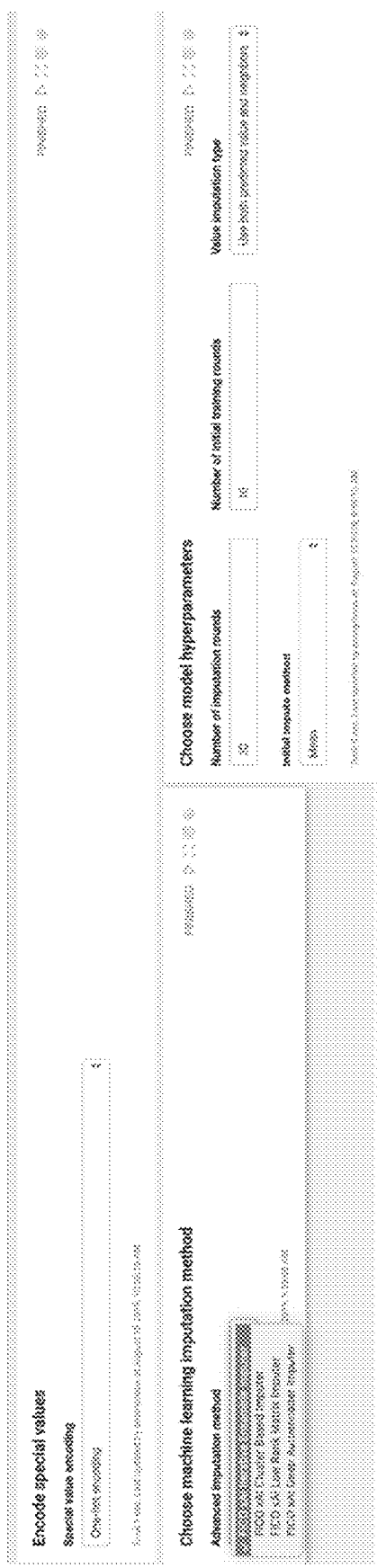
FIG. 6 illustrates an example interface that allows a user to select the imputation methods and corresponding parameters, while taking missing reasons into account, allowing users to choose from a variety of encoding methods, in accordance with certain embodiments.

Referring to FIG. 5, a set of features may be automatically pre-identified, where the set of features may be associated with missing or special values. For example, if a feature is automatically identified as missing a value, the missing value may be replaced by a special value code. In one embodiment, the missing value (and the special value code which corresponds to the missing reason of the data) may be reported to help a user better understand the ML model and the training dataset provided to the ML model. The users may also specify their own special values and update the pre-identified missing or special values. As shown in FIG. 6, if features Y and Z are selected as having special values, for example, one or more graphical user interface menus may be presented to allow a user choose special values for the selected features (e.g., −3, −7 for Y, and −2, −8 for Z).

Figure 7:
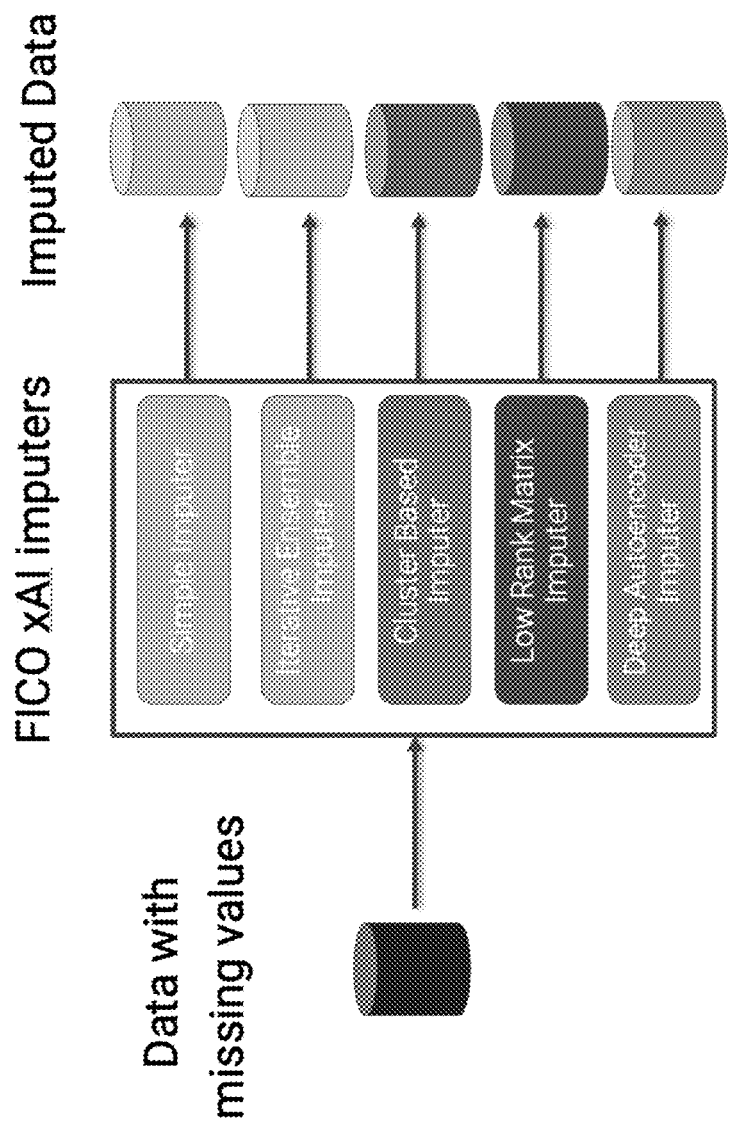
FIG. 7 illustrates example methods for imputing a missing or special value, in accordance with one or more embodiments, based on a range of imputation algorithms.

Referring to FIGS. 6 and 7, users may select one or more imputation methods and specify one or more corresponding parameters or hyperparameters for the imputation methods. Depending on implementation, both naïve imputers (column mean, column median, column mode, column minimum, column maximum, zero, and random value imputer) and advanced imputers (iterative ensemble imputer, clustering based imputer, deep autoencoder imputer, and low rank matrix imputer) may be supported. Furthermore, missing reasons may be also taken into account by allowing users to choose from a variety of missing reason encoding methods. For example, a computer-implemented method or tool may be used for imputing the missing or special value using a selected imputation method. The tool may support a wide range of imputation algorithms ranging from naïve fixed value imputation to advanced ML based imputation.

Figure 8:
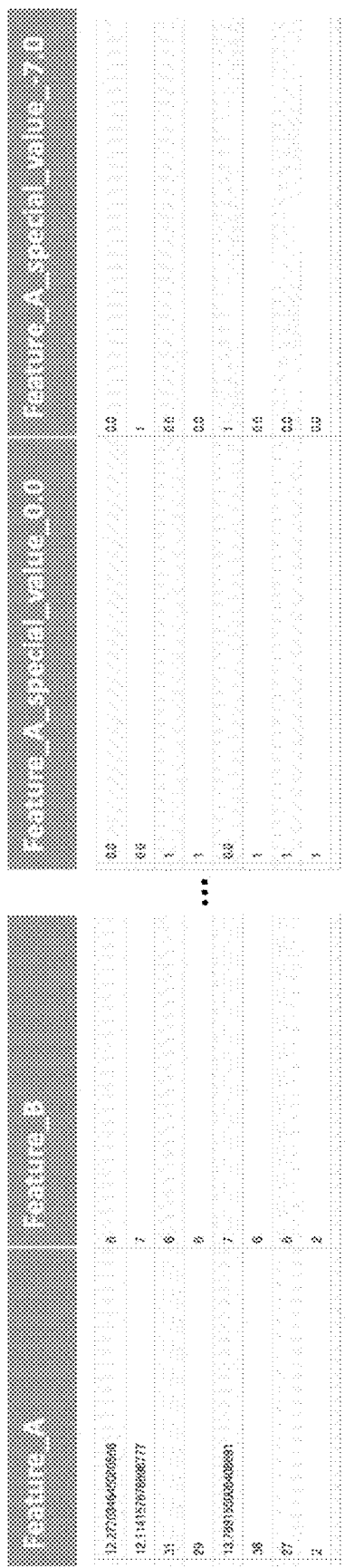
FIG. 8 illustrates an example dataset with imputed missing or special values, which may be generated in accordance with certain embodiments by encoding a missing reason for a feature with a missing value.

Referring to FIG. 8, an example dataset returned by an imputing method is illustrated, where the dataset includes imputed missing or special values for example features A and B. After imputing the missing values, the missing reasons encoded for one or more features with missing values may be calculated and the encoded data may be added to the imputed data.

Different approaches or implementations may be utilized to combine imputed feature values with missing reasons. In accordance with an example implementation, a computer-implemented imputing system (i.e., an imputer) may be utilized to apply one or more imputation methods to impute missing values for datasets provided to a ML model. The following imputation methods may be used in accordance with one or more embodiments:

Impute missing data points with zeros.
Impute missing data points with column mean value.
Impute missing data points with column median value.
Impute missing data points with column mode (most frequent occurring) value.
Impute missing data points with column minimum value.
Impute missing data points with column maximum value.
Impute missing data points with uniform random samples parameterized by the minimum and maximum value of each column.

An iterative ensemble imputer may be used, in some implementations, to impute the missing values based on creating an ensemble of imputed datasets. The final imputation result may be obtained by taking the average of two or more imputed datasets in the ensemble. An imputed dataset may be created by imputing missing values in one or more columns via iteratively simple machine learning models, such as a linear regressor, from observed data points in one or more other columns of the dataset. For a column in the dataset, the imputer may first identify missing values and corresponding record locations. A linear regression model may be trained using the rows without missing value. After obtaining the trained regressor, missing values may be imputed by estimation, for example, using the other observed data. The regressor of the missing value in one column may be learned based on the imputed data in other columns.

A cluster-based imputer may be used, in certain embodiments, to impute missing values by considering the feature values from the missing value's nearest neighbors, for example. If the number of potential neighbors is less than a certain threshold, the training set average for that feature is used to impute the missing value. A low rank matrix imputer may be used to impute the missing values by considering the entire or a part of the dataset as a matrix with certain rankings. The missing values may be filled or completed with some initial values, in one example implementation. Two or more low rank decomposition matrices may be learned based on generalized loss functions and regularizers defined for different feature columns in the dataset. A missing value may be ultimately imputed by the reconstruction of the original dataset from the two or more low rank matrices.

A deep autoencoder imputer may be used to impute the missing values. Deep autoencoders (DAE) may provide a good representation of data samples by learning a non-linear transformation from the features to a representation space that captures useful structure in an associated value distribution across a plurality of data points. The deep autoencoder imputer imputes missing values by learning transformations to map the data samples to a representation space and then reconstruct the original feature space from the representation space. In an example implementation, the missing values may be completed with some initial values. Then, the autoencoder compresses the data to a low dimensional representation and reconstructs the data from the representation. The autoencoder may be trained based on a generalized loss function which allows users to specify different loss functions for different features.

Once the missing values are imputed, a description of the missing reason may be provided by functions that incorporate the missing reasons with the imputed features, for example, by special value encoding. Depending on implementation, various approaches may be used to incorporate or encode the missing reason with the imputed features. For example, the missing reasons may be encoded into either numerical data or categorical data.

Figure 9:
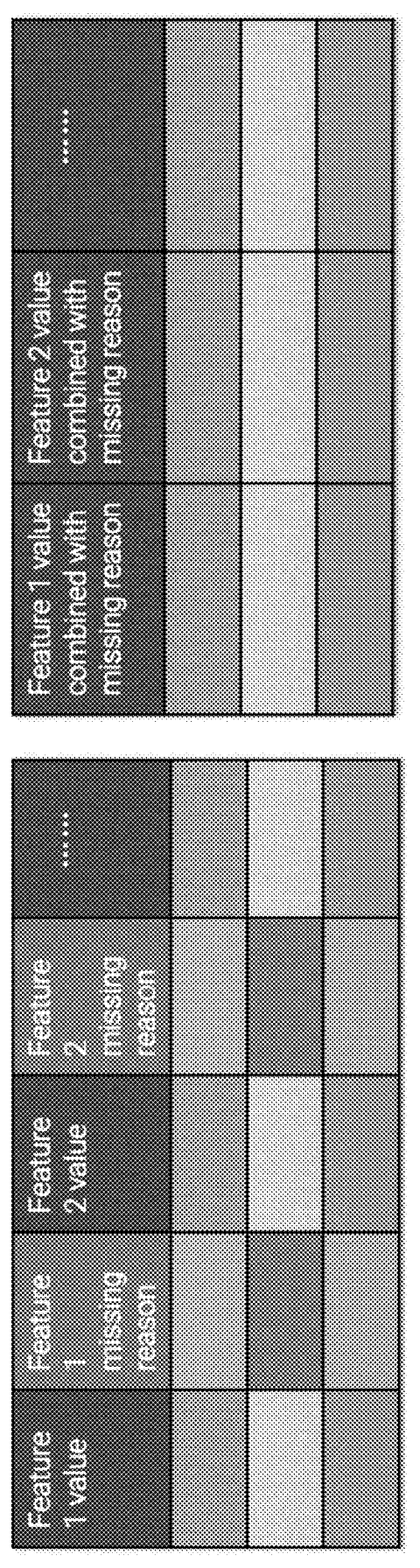

As shown in FIG. 9, for example, one approach is to create a feature column to encode the missing reasons (see columns on the left). If the data is not missing, the missing reason may be set to a default value (e.g., 0). Otherwise, the missing reason is encoded based on user specified categorical data encoding methods. In another approach, the feature values and the special value code may be combined via a function that takes both variables as input (see columns on the right of FIG. 9).

Combined with the imputed dataset, a dataset with encoded missing values and reasons provides a more comprehensive view for a machine learning model. Since most of the reasons can be modeled by categorical variables, various categorical data encoding methods may be used to encode the reasons. A list of example coding methods is provided below.

- One-hot encoding: one-hot encoding produces one feature per category, a feature is a binary variable indicating whether the feature belongs to each category.
- Backward difference encoding: in backward difference coding, the mean of the dependent variable for a feature value is compared with the mean of the dependent variable for the prior adjacent level. This type of coding may be useful for a nominal or an ordinal variable.
- Binary encoding: binary encoding is similar to one-hot encoding, but stores categories as binary bitstrings.
- Base N encoding: base N encoding encodes the categories into arrays of their base N representation. A base of 1 is equivalent to one-hot encoding, a base of 2 is equivalent to binary encoding. If N is equal to the number of actual categories, then base N encoder is equivalent to ordinal encoder.
- Hashing encoding: hashing encoding uses a basic multivariate hashing implementation with configurable dimensionality/precision to encode categorical data.
- Helmert encoding: Helmert encoding compares one or more levels of a categorical variable to the mean of the subsequent levels.
- James-Stein encoding: James-Stein encoding uses the result of a James-Stein estimator to encode the features. For a feature value, James-Stein estimator returns a weighted average of the mean target value for the observed feature value and the global mean target value (regardless of the feature value).
- Target encoding: target encoding is the process of replacing a categorical value with the mean of the target variable.
- Leave-one-out encoding: leave-one-out encoding is very similar to target encoding but excludes the current row's target when calculating the mean target for a level to reduce the effect of outliers.
- Catboost encoding: Catboost encoding is very similar to target encoding. It first permutes the set of input objects. Then it converts the target value from a floating point to an integer. Finally, it transforms categorical features to numerical features.
- M-estimate encoding: M-estimate encoding uses M-probability estimate of likelihood. It is a simplified version of target encoder.
- Ordinal encoding: ordinal encoding encodes categorical features as ordinal, in one ordered feature.
- Polynomial encoding: polynomial contrast coding for the encoding of categorical features.
- Sum encoding: sum contrast coding for the encoding of categorical features.
- Weight of evidence encoding: weight of evidence encoding uses weight of evidence to encode the categorical features.

Figure 10:
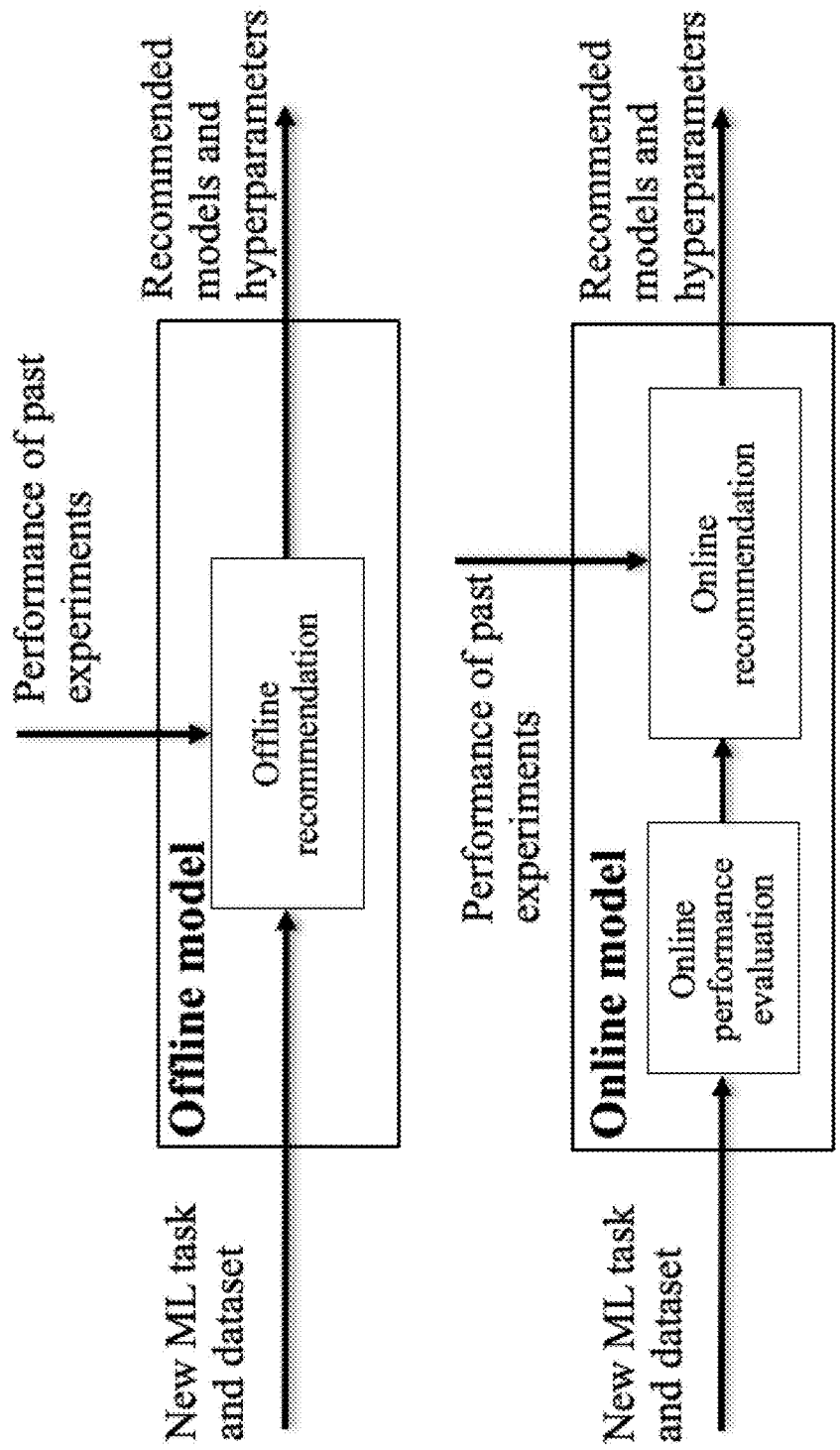
FIG. 10 is an example block diagram of a missing or special value recommendation system, in accordance with one or more embodiments.

Referring to FIG. 10, in certain embodiments, one or more missing or special value handling recommendation modules may be used to recommend imputation and encoding methods as well as hyperparameters by considering the machine learning task and the properties of the dataset. Two recommendation approaches may be used for selecting the missing or special value handling methods and hyperparameters. In a first approach, an offline recommendation module may be used to leverage the performance of past experiments and recommend missing or special value handling methods and hyperparameters based on the similarity of new ML tasks and datasets. In this approach, there may not be a need for running an experiment on the new dataset.

In a second approach, an online recommendation module may be used to recommend missing or special value handling methods and hyperparameters based on the performance of the models and hyperparameters obtained via past experiments as well as the performance evaluated on the new task and dataset within a fixed time budget. In some implementations, the recommendation module may be used for recommending models and hyperparameters for missing or special value handling, supporting both online and offline recommendation.

Accordingly, a comprehensive framework to handle missing values with different missing reasons in ML models is provided. The framework is implemented to provide initial analysis for the data and automatically identify a set of missing values; provide a wide range of both simple and advanced imputation methods to impute missing value; and allow users to customize the parameter of one or more imputation methods to serve specific needs. The imputed feature value may be combined with missing reasons to provide a comprehensive view of the data.

Figure 11:
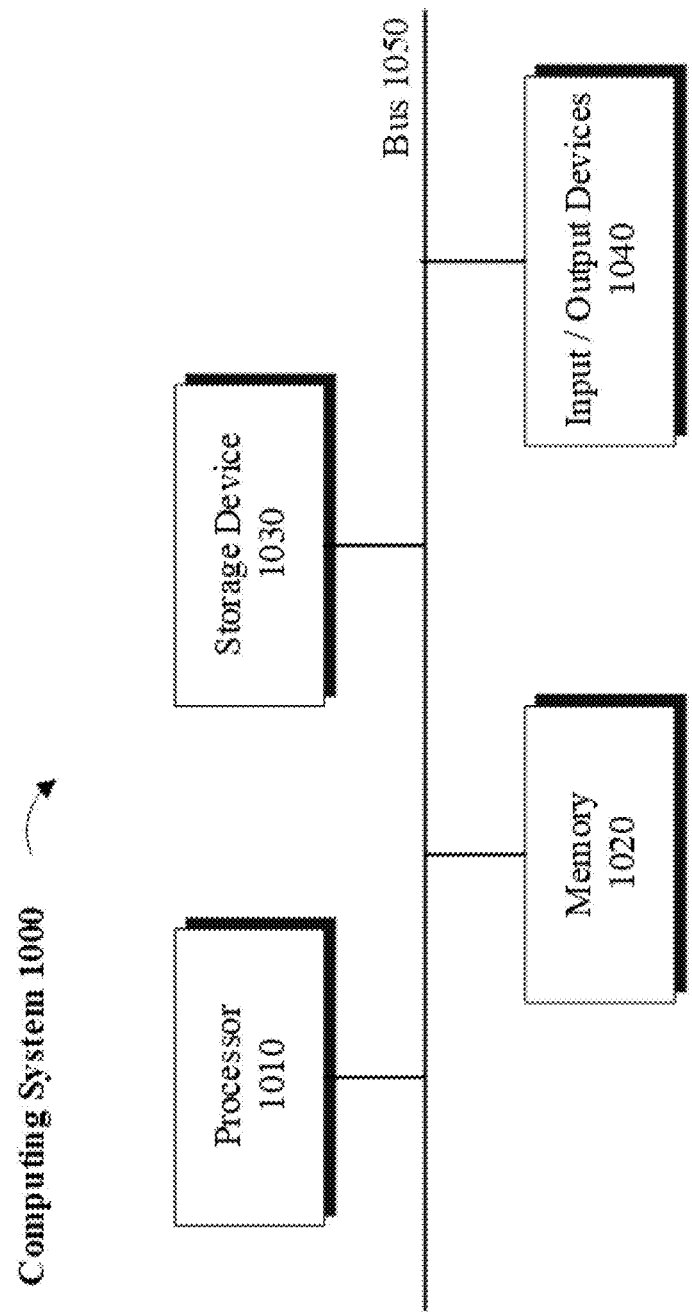
FIG. 11 is an example block diagram of a computing platform for performing the operations disclosed herein, in accordance with one or more embodiments.

Referring to FIG. 11, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 11, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method for managing missing values for a machine learning model, the method comprising:

identifying a missing value and a corresponding missing value reason for the missing value in a dataset with data point values, one or more of the data point values being associated with one or more features of the machine learning model;

applying an imputation method to generate an imputed feature for the missing value based on an imputation method;

replacing the missing value in the dataset with the imputed feature, the replacing comprising encoding the imputed feature with the corresponding missing value reason for the missing value for which the imputed feature is imputed; and improving the machine learning model using the imputed feature.

2. The method of claim 1, wherein data statistics are computed to determine that the missing value is missing.

3. The method of claim 2, wherein in response to interaction with a domain expert, it is verified that the missing value is missing.

4. The method of claim 1, wherein an encoding process is utilized to provide reasons for the missing value missing from the dataset.

5. The method of claim 4, wherein the provided reasons and the imputed feature for the missing value and a corresponding reason for the missing value missing from the dataset are combined.

6. The method of claim 1, wherein the imputation method comprises imputing a value of zero for the imputed feature.

7. The method of claim 1, wherein the imputation method comprises at least one of a column mean value, a column media value, a column mode value, a column minimum value, or a column maximum value to impute the imputed feature for the missing value.

8. The method of claim 1, wherein a deep autoencoder is used to impute the imputed feature for the missing value.

9. The method of claim 4, wherein one or more missing or special value handling recommendation modules are utilized to recommend at least one of an imputation method for imputing the feature value of the first data point and an encoding process for providing the reasons for the first data point missing from the dataset.

10. The method of claim 9, wherein an on-line or offline recommendation module is used to recommend missing or special value handling methods and hyperparameters, wherein the hyperparameters are used to by the imputation method which is selected by a user.

11. A system comprising:

at least one programmable processor; and a non-transitory machine-readable medium storing instructions that, when executed by the at least one programmable processor, cause the at least one programmable processor to perform operations comprising:

identifying a missing value and a corresponding missing value reason for the missing value in a dataset with data point values, one or more of the data point values being associated with one or more features of the machine learning model;

applying an imputation method to generate an imputed feature for the missing value based on an imputation method;

replacing the missing value in the dataset with the imputed feature, the replacing comprising encoding the imputed feature with the corresponding missing value reason for the missing value for which the imputed feature is imputed; and improving the machine learning model using the imputed feature.

12. The system of claim 11, wherein data statistics are computed to determine that the missing value is missing.

13. The system of claim 12, wherein in response to interaction with a domain expert, it is verified that the missing value is missing.

14. The system of claim 11, wherein an encoding process is utilized to provide reasons for the missing value missing from the dataset.

15. The system of claim 14, wherein the provided reasons and the imputed feature for the missing value and a corresponding reason for the missing value missing from the dataset are combined.

16. A computer program product comprising a non-transitory machine-readable medium storing instructions that, when executed by at least one programmable processor, cause the at least one programmable processor to perform operations comprising:

identifying a missing value and a corresponding missing value reason for the missing value in a dataset with data point values, one or more of the data point values being associated with one or more features of the machine learning model;

applying an imputation method to generate an imputed feature for the missing value based on an imputation method;

replacing the missing value in the dataset with the imputed feature, the replacing comprising encoding the imputed feature with the corresponding missing value reason for the missing value for which the imputed feature is imputed; and improving the machine learning model using the imputed feature.

17. The computer program product of claim 16, wherein data statistics are computed to determine that the missing value is missing.

18. The computer program product of claim 17, wherein in response to interaction with a domain expert, it is verified that the missing value is missing.

19. The computer program product of claim 16, wherein an encoding process is utilized to provide reasons for the missing value missing from the dataset.

20. The computer program product of claim 19, wherein the provided reasons and the imputed feature for the missing value and a corresponding reason for the missing value missing from the dataset are combined.

* * * * *